Figure 1:
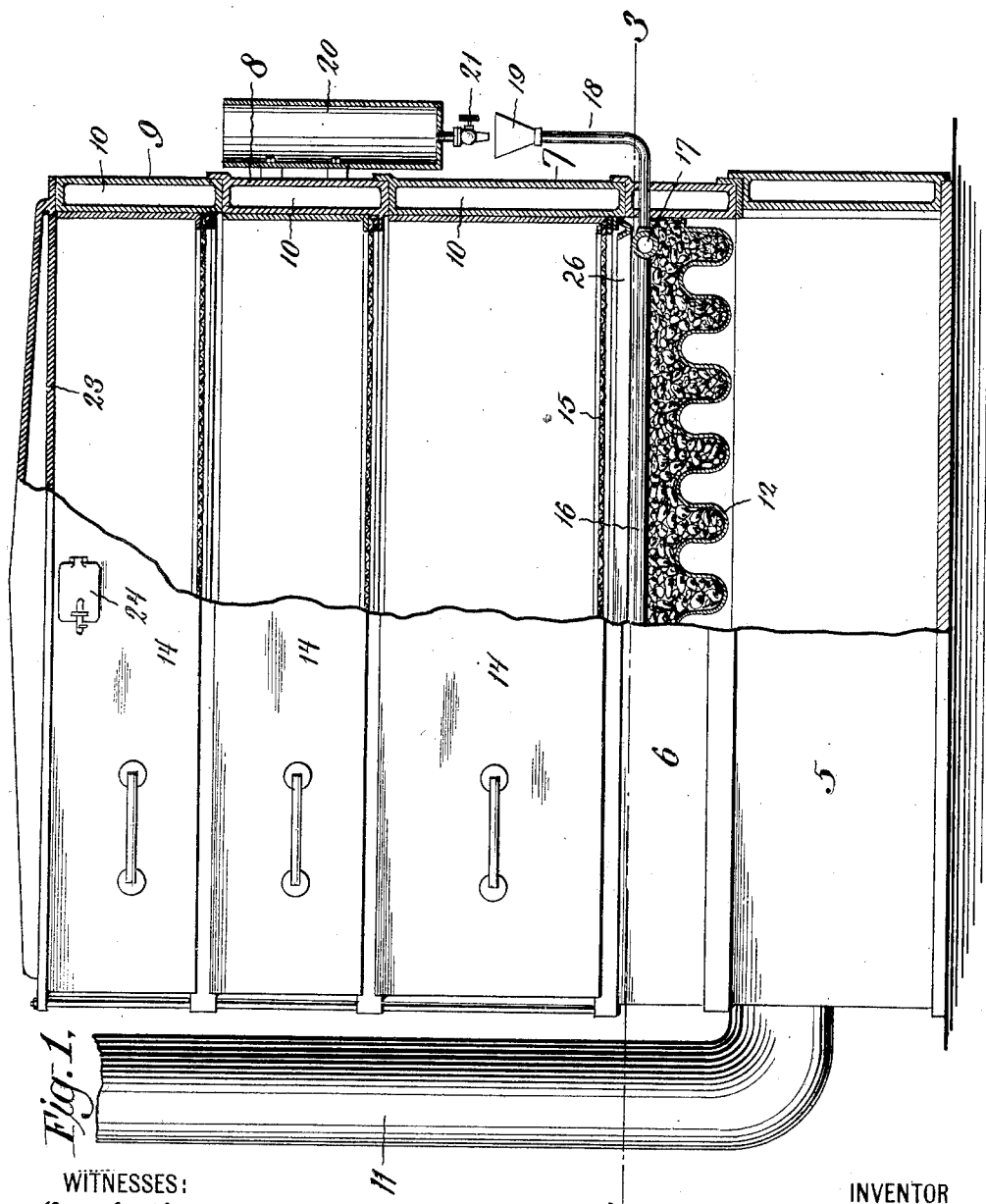

No. 675,571. Patented June 4, 1901.
J. RUPPERT.
COOKING STOVE.
(Application filed Dec. 13, 1900.)
(No Model.) 2 Sheets—Sheet 1.

WITNESSES:
D. N. Hayward.
Harry L. Goss.

INVENTOR
Jacob Ruppert
BY
Henry D. Williams
ATTORNEY

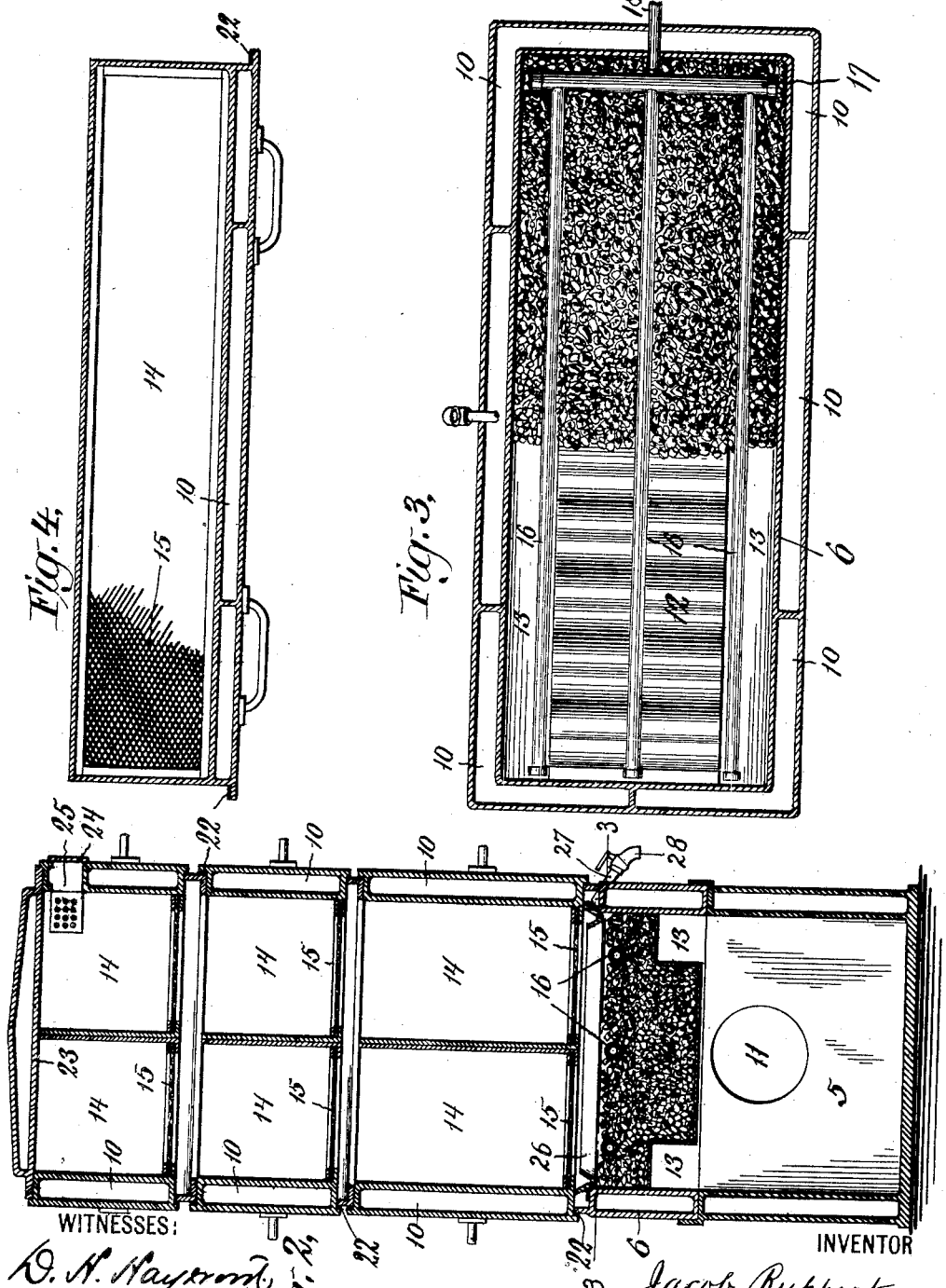

UNITED STATES PATENT OFFICE.

JACOB RUPPERT, OF NEW YORK, N. Y.

COOKING-STOVE.

SPECIFICATION forming part of Letters Patent No. 675,571, dated June 4, 1901.

Application filed December 13, 1900. Serial No. 39,674. (No model.)

*To all whom it may concern:*

Be it known that I, JACOB RUPPERT, a citizen of the United States, and a resident of the borough of Manhattan, in the city of New York, county of New York, and State of New York, have invented new and useful Improvements in Cooking-Stoves, of which the following is a specification, reference being had to the accompanying drawings, forming part thereof.

My invention relates to cooking-stoves, and particularly to stoves adapted to cook an aggregation of fish, poultry, vegetables, and the like to produce that which is known as a "Rhode Island clam-bake."

The ordinary and well-known method of preparing a Rhode Island clam-bake is to form a bed of stones and to prepare a wood-fire upon these stones, keeping the same burning for four or five hours and until the stones have been thoroughly heated, then to remove the fire and cleanse the stones without cooling them, to place a quantity of raw clams in their shells upon the hot stones, to add upon the top of these clams such fish, poultry, and vegetables as may be desired, and to cover the whole mass with seaweed in order to retain the heat as much and for as long a time as possible. A canvas cover or tarpaulin is usually added as an additional precaution. The clams as they begin to be cooked by the heat radiated from the stones open their shells and give up their juice. The juice falling upon the hot stones is evaporated, and the products of evaporation rising up permeate the fish, poultry, and vegetables, and thereby give them the distinctive flavor of the "clam-bake." The whole mass is gradually cooked by the heat radiated from the hot stones, and when so cooked is ready to be served. The seaweed performs no function but that of a means for retaining the heat.

Now it is a well-known fact that many clam-bakes are failures, and this is easily accounted for. In the first place it often happens that the stones cool before the mass is cooked. Again, the products are often very unevenly cooked, for the distribution of heat is liable to be uneven. Again, it is a matter of difficulty to tell when the mass is cooked, and should the seaweed be removed for the purpose of investigation a great deal of the heat is necessarily lost.

It is the purpose of this invention to supply a cleanly, simple, and effective apparatus wherein a clam-bake may be practically and scientifically prepared and in which the element of chance as to the success of the product will be eliminated. In carrying out my invention I provide an oven and a heating-chamber out of direct communication therewith, and between the oven and the heating-chamber I interpose a radiating and evaporating tray containing stones, pebbles, or other non-combustible heat-radiating materials, whereby a large radiating and evaporating surface is obtained.

In the form of my invention illustrated in the drawings herewith I provide the oven with a plurality of perforated food-trays. I further provide means for giving an auxiliary supply of fluid for the purpose of evaporation.

My invention further consists in certain details of construction and combination of parts, as will be hereinafter more fully set forth, and I will now proceed to describe the cooking-stove embodying my invention illustrated in the accompanying drawings.

Figure 1 is a partial side elevation and partial central longitudinal section of a cooking-stove embodying my invention. Fig. 2 represents a central transverse section of the same. Fig. 3 represents a horizontal section taken upon the plane of the line 3 3 of Fig. 1. Fig. 4 is a horizontal section of one of the drawers or trays employed.

In the preferred form of my invention my improved cooking-stove comprises a number of separable sections, which may readily be taken apart and put together again for convenience in transportation.

In the form of my invention illustrated herein my improved cooking-stove comprises five sections, the lower section 5 forming a heating-chamber. The section immediately above it (indicated by the reference character 6) carries the evaporating tray or receptacle for the stones, pebbles, or other non-combustible or heat-radiating material, and sections 7, 8, and 9, arranged successively above the evaporating-section 6, constitute holders or casings for food-holding trays mounted therein. All the sections are heat-insulated in order to prevent as much as possible the internal heat from radiating to the atmosphere, and to this end each section comprises double walls, inclosing chambers, as at 10, between them, such chambers constituting dead-air spaces. Obviously asbestos or mineral wool may be inclosed within the chambers, if desired, or other suitable form of lagging may be employed. The fire, which may conveniently be a log-fire, may be built within the heating-chamber 5, and for the purpose of conveying away the products of combustion therefrom I have provided a flue or uptake 11. Gas or other burners may be employed in the heat-chamber, if desired. The evaporating tray or receptacle for holding the stones, &c., is secured within and to the section 6, and for the purpose of obtaining a greater heating-surface in the receptacle itself I have constructed the same in corrugated form, as at 12, with longitudinal flues 13 13 running lengthwise upon opposite sides. In and upon this receptacle or tray I preferably place a large quantity of small stones, pebbles, or the like, which form good heat-conducting and heat-radiating material. The section 7, which is arranged immediately above the section 6, carries two trays or drawers 14. These trays or drawers are arranged to pull out upon opposite sides of the stove and are provided with handles for such purpose. The bottoms of these trays or drawers are perforated and are preferably formed of wire-gauze of mesh No. 15. In preparing the clam-bake I place the clams in these two drawers or trays 14. When these clams are heated, they open their shells and give up their juice, which passes down through the perforated bottom 15 on the stones, pebbles, or the like in the receptacle 12, and such stones, pebbles, or the like being heated the juice rapidly becomes vaporized and passes upward as vapor and circulates through the upper part of the stove. The upper sections 8 and 9 carry two drawers or trays each similar to those carried by the section 7. In these drawers or trays I place the fish, vegetables, poultry, &c., which form a part of the clam-bake, and the clam-juice vapors permeate and cook all of this fish, vegetables, and poultry, thereby giving to them that flavor which is the essential and distinctive feature of a Rhode Island clam-bake.

In case it should be desired to vaporize clam-juice before the clams within the trays or drawers 14 have opened to give up their juice or to at any time increase the quantity of vapor, a means is shown for introducing an auxiliary supply in a plurality of pipes 16, communicating with a header 17, connecting with a leading-in pipe 18, having a funnel 19 at the end thereof. A suitable tank 20 is secured to the stove in any convenient location, and an auxiliary supply of clam-juice may be contained within the said receptacle 20. A cock 21 is provided for controlling the discharge of the clam-juice.

If it be desired to give an auxiliary supply of clam-juice, it is merely necessary to open the cock 21 and the clam-juice from the receptacle 20, flowing through the pipe 18 and header 17, will be discharged through the distributing-pipe 16 onto the vaporizing-tray through orifices in the distributing-pipe arranged for such purpose.

It usually happens that the greater number of the clams open and discharge their juice at about the same time, and to provide for this and prevent overflow of the clam-juice should the quantity discharged exceed the capacity of the evaporating-tray 13 I provide an overflow-trough upon the evaporating-tray having a drip-pipe leading out therefrom. This overflow-trough 26 is shown as arranged about the upper margin of the evaporating-tray 13 and as constructed with its inner wall slightly lower than its outer wall, so that if the clam-juice rises in the tray to the level of this inner wall it will flow into the overflow-trough and must fill this trough and rise to the level of the outer wall thereof before it can overflow, and a drip-pipe 27 is located in this trough and may have a valve or cock therein, as the cock 28. With the cock 28 open the clam-juice which flows into the overflow-trough may be drained off into a suitable receptacle and poured from this receptacle into the auxiliary supply-tank for use in the same or a subsequent cooking operation.

I have arranged that the sections shall overlap each other and shall fit with a certain degree of accuracy in order to have as little leakage of the clam-juice vapor as possible. For this purpose I have further provided a packing 22, arranged around a flange of the drawer-fronts, (see more particularly Figs. 2 and 4,) which packing will further tend to prevent leakage.

I have provided a suitable top 23, which is arranged over the topmost section 10 and which I also preferably insulate as to heat radiation.

I have shown one of the upper drawers or trays as provided with a small chamber 25 and a door 24 in front of this small chamber. A sample vegetable, such as a potato, or samples of the various vegetables, fish, and poultry may be placed within this chamber 25 and may be examined upon opening the small door 24 to determine the condition of the bulk of the material which is being cooked within the stove.

I do not desire to be limited to the precise construction herein shown and described, as the same may obviously be varied within wide limits without departing from the spirit and scope of my invention.

What I desire to claim is—

1. A cooking-stove comprising an oven, a heating-chamber so constructed that the products of combustion therein will not enter the oven, and an evaporating-tray containing stones, pebbles or other non-combustible heat-radiating material and interposed between the oven and the heating-chamber, substantially as set forth.

2. In a cooking-stove, the combination with a heating-chamber and a closed oven, the oven having no direct communication with the heating-chamber, of an evaporating-tray containing stones, pebbles or other non-combustible heat-radiating material and interposed between the oven and the heating-chamber, substantially as set forth.

3. In a cooking-stove, the combination with a heating-chamber and an oven having no direct communication therewith, of an evaporating-tray containing stones, pebbles or other non-combustible heat-radiating material and interposed between the oven and the heating-chamber, a perforated food-tray in the oven and above the evaporating-tray, and means located in the lower part of the oven, beneath the food-tray, for distributing an auxiliary supply of fluid over the material in the evaporating-tray, substantially as set forth.

4. In a cooking-stove the combination with a heating-chamber and an oven having no direct communication therewith, of an evaporating-tray arranged between said heating-chamber and said oven and containing stones, pebbles or other non-combustible heat-radiating material, said evaporating-tray having its bottom corrugated at the central portion and having side flues, substantially as set forth.

5. A cooking-stove comprising a plurality of separable sections, the lower section including a heating-chamber, the upper section or sections including the oven, and the section intermediate thereof carrying an evaporating-tray containing stones, pebbles or other non-combustible heat-radiating material, substantially as set forth.

6. A cooking-stove comprising a plurality of separable sections, the lower section including a heating-chamber, the upper section or sections including the oven, and the section intermediate thereof carrying an evaporating-tray containing stones, pebbles or other non-combustible heat-radiating materials, the said sections being externally heat-insulated, substantially as set forth.

7. In a cooking-stove the combination with a suitable casing, of a plurality of perforated food-trays arranged therein and superposed one upon another, a heating-chamber inclosed by the casing below the food-trays but out of direct communication therewith and an evaporating-tray interposed between the food-trays and the heating-chamber and containing stones, pebbles or other non-combustible heat-radiating material, substantially as set forth.

8. In a cooking-stove the combination with a suitable casing of a plurality of perforated food-trays arranged therein and superposed one upon another in pairs, the said trays adapted to be withdrawn from opposite sides of the casing, a heating-chamber inclosed by the casing and below the food-trays but out of direct communication therewith, and an evaporating-tray interposed between the food-trays and the heating-chamber, and containing stones, pebbles or other non-combustible heat-radiating material, substantially as set forth.

9. In a cooking-stove the combination with a heating-chamber and an oven having no direct communication therewith and a food-tray in the oven and an evaporating-tray in the oven and interposed between the heating-chamber and the food-tray and containing stones, pebbles or other non-combustible heat-radiating material, and means for drawing off an overflow of fluid from the evaporating-tray, substantially as set forth.

10. In a cooking-stove the combination with a heating-chamber, of a perforated food-tray, an evaporating-tray interposed between the heating-chamber and the food-tray, and containing stones, pebbles or other non-combustible heat-radiating material, and an overflow-trough in communication with the upper part of the evaporating-tray, substantially as set forth.

11. In a cooking-stove the combination with a heating-chamber and an oven and a food-tray therein, of an evaporating-tray interposed between the heating-chamber and the food-tray, and an overflow-trough arranged about the upper margin of the evaporating-tray and a drip-pipe leading out from the overflow-trough, substantially as set forth.

12. In a cooking-stove the combination with a heating-chamber and an oven and a food-tray therein, of an evaporating-tray interposed between the heating-chamber and the food-tray, and an overflow-trough arranged about the upper margin of the evaporating-tray and a drip-pipe leading out from the overflow-trough, substantially as set forth.

Signed at New York, N. Y., this 11th day of December, 1900.

JACOB RUPPERT.

Witnesses:
 JOHN G. GILLIG,
 E. FRIEDMANN.